Sept. 7, 1926.

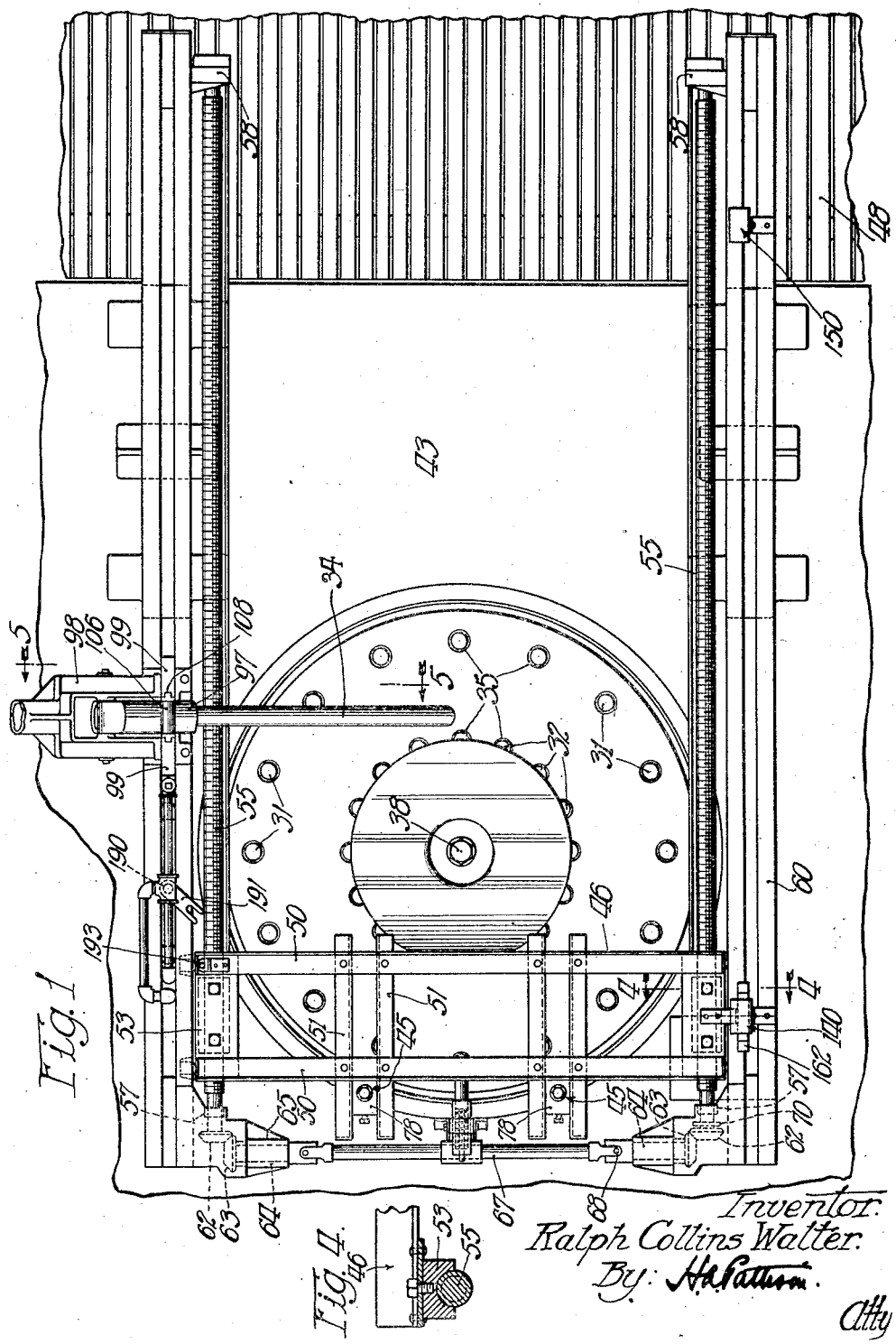

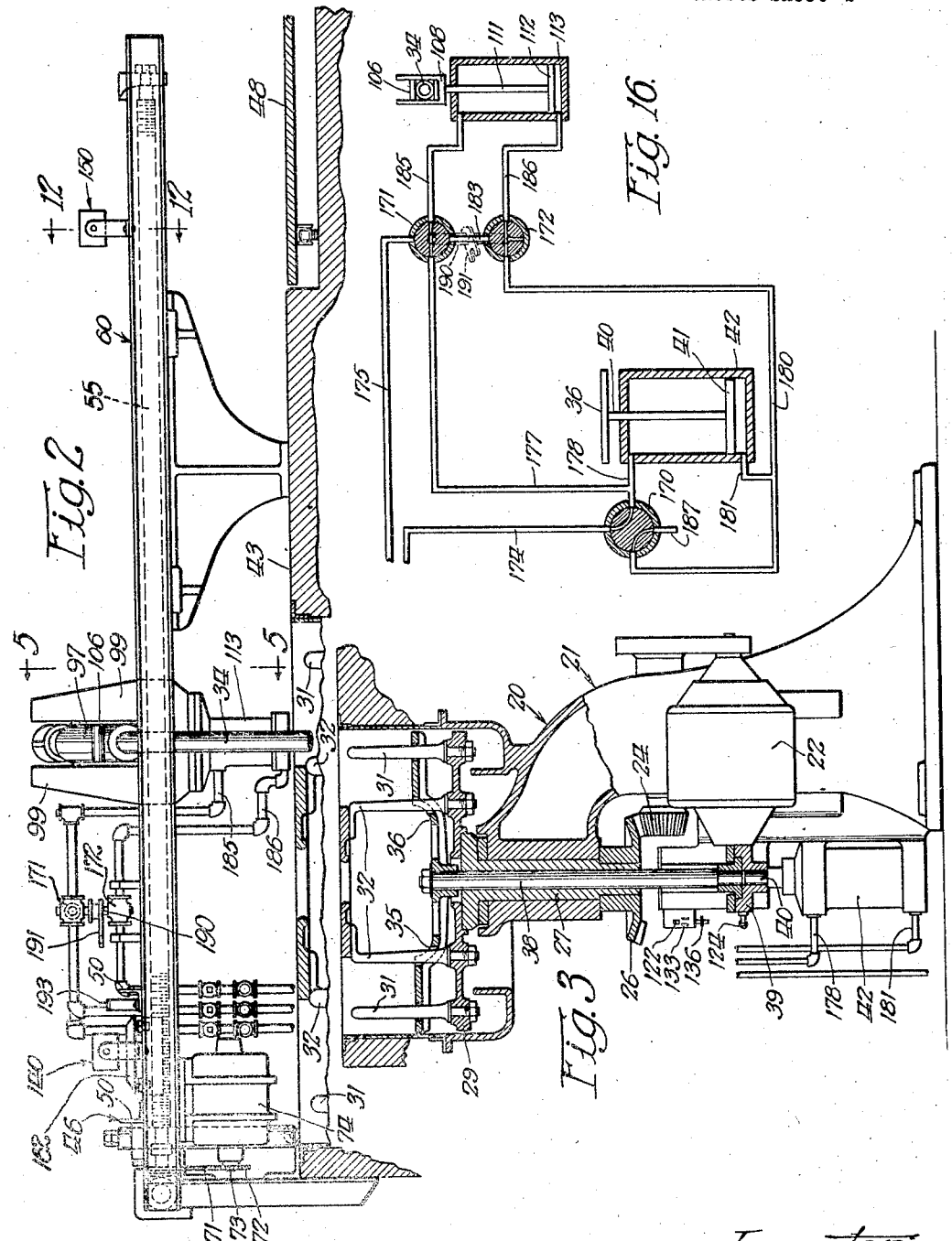

R. C. WALTER

GUIDING APPARATUS

Filed Nov. 14, 1924     4 Sheets-Sheet 3

1,598,835

Inventor
Ralph Collins Walter.
By H. Patters
Atty.

Sept. 7, 1926.
R. C. WALTER
1,598,835
GUIDING APPARATUS
Filed Nov. 14, 1924    4 Sheets-Sheet 4
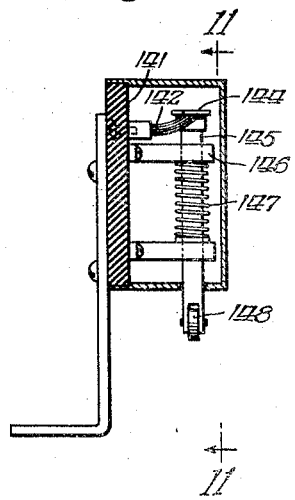
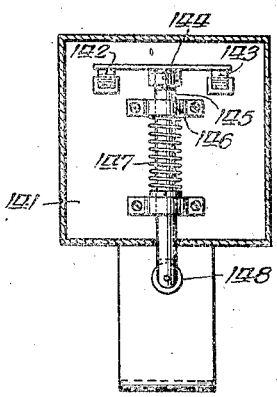
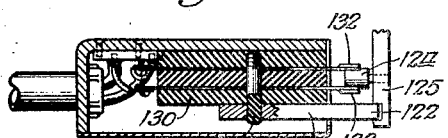
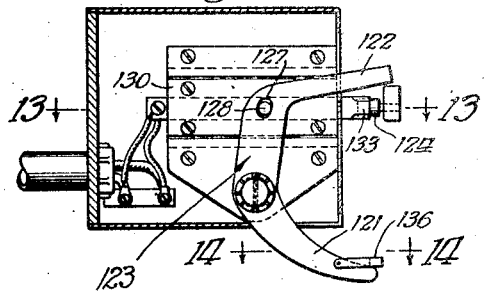
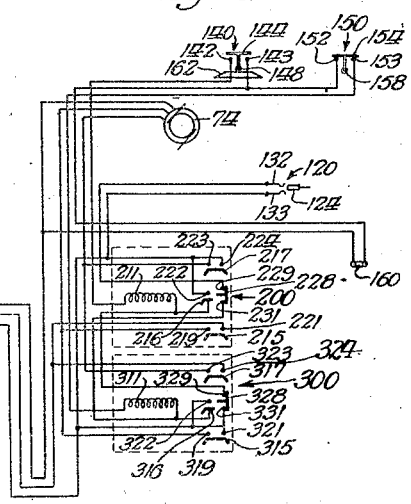
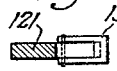
Inventor
Ralph Collins Walter.
By: H. A. Pattison
Atty.

Patented Sept. 7, 1926.

1,598,835

UNITED STATES PATENT OFFICE.

RALPH COLLINS WALTER, OF WESTERN SPRINGS, ILLINOIS, ASSIGNOR TO WESTERN ELECTRIC COMPANY, INCORPORATED, OF NEW YORK, N. Y., A CORPORATION OF NEW YORK.

GUIDING APPARATUS.

Application filed November 14, 1924. Serial No. 749,954.

This invention relates to guiding apparatus, and particularly to guiding rods to a coiling machine.

The object of this invention is to provide improved means for guiding material to a predetermined position or apparatus.

One form of the invention is embodied in apparatus for coiling rods, the rods being coiled, removed from the coiling means, and transferred to a conveyor leading to a quenching bath or the like. The rod is guided to the coiling means by a pivotally mounted tube movable out of its operative position to permit the transfer of the coiled rod to the conveyor. The operation of a common pneumatic valve causes the stripping of the coil from the coiling means and the tube to be moved to permit the transfer of the coil to the conveyor. However, during the transferring operation compressed air is supplied independently of the stripping control mechanism to pneumatic means associated with the tube, thus retaining the tube in its inoperative position while the stripping mechanism is returned to normal. When the coil transferring means returns to its normal position, the independent supply of air is discontinued and the tube returns to its operative position. The rod is supplied to the tube from the rolling mill through a pipe, terminating a sufficient distance from the receiving end of the tube to permit the engagement and withdrawal of the rod, if desired.

Other features of the invention will become apparent as the detailed description progresses, reference being had to the accompanying drawings, wherein Fig. 1 is a plan view of apparatus embodying the invention;

Fig. 2 is a side elevation, partly in section, of the improved apparatus;

Fig. 3 is a central section through a coiling machine with which the improved apparatus cooperates;

Fig. 4 is a section taken on line 4—4 of Fig. 1;

Fig. 10 is a section through an electrical switch forming a part of the improved apparatus;

Fig. 11 is a section taken on line 11—11 of Fig. 10;

Fig. 12 is a view of another switch forming a part of the improved apparatus;

Figure 7:
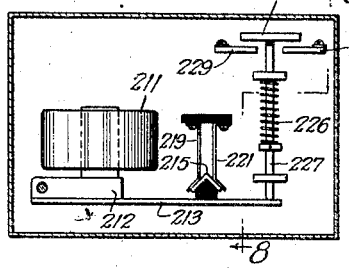
Fig. 7 is a view of an electrical relay which forms a part of the improved apparatus.

Figs. 13 and 14 are sections taken on lines 13—13 and 14—14 of Fig. 12;

Fig. 15 is a diagram of a circuit which forms a part of the improved apparatus, and Fig. 16 is a diagrammatic view of pneumatically operated mechanism which forms a part of the improved apparatus.

Referring to Figs. 1, 2, and 3, 20 designates generally a coiling machine comprising a base 21 upon which is mounted a motor 22 adapted to drive a pinion 24 meshing with a bevel gear 26. The bevel gear 26 is secured to a sleeve 27 which is journaled in the base 21 and has rigidly secured to it a disc 29. Projecting upwardly from the disc 29 are pins 31 and 32. The pins 31 and 32 are adapted, when the motor is operated, to coil rod guided into the space between the pins by a tube 34. The pins 31 and 32 project through apertures 35 formed in a stripping plate 36 secured to a rod 38 which is slidably journaled in the sleeve 27 and is connected by a coupling 39 to a piston rod 40 secured to a piston 41 disposed in a pneumatic cylinder 42. The cylinder 42 is connected to any suitable source (not shown) of fluid under pressure by means hereinafter described so that the fluid may be admitted thereto to move the piston rod 40, the rod 38 and the stripping plate 36 upwardly in such manner that rod coiled upon the pins 32 is stripped therefrom and raised to the level of a floor 43.

Posts 45 depending from a carriage 46 are adapted to push the coiled rod across the floor 43 onto a conveyor 48 driven by any suitable means (not shown) and adapted to deposit the coiled rod in a quenching bath (not shown) or the like. The carriage 46 comprises angle irons 50 and 51, the angle irons 51 being secured to the angle irons 50 and being arranged transversely thereof. The carriage 46 also comprises threaded blocks 53 which are secured to the angle irons 50 and engage horizontally disposed threaded rods 55. The threaded rods 55 are rotatably journaled in bearings 57 and 58 mounted upon a frame 60. Secured to each threaded rod 55 is a bevel gear 62 which meshes with a bevel gear 63 secured to a shaft section 64 journaled in a bearing 65 mounted upon the frame 60. The shaft sections 64 are operatively connected to each other by a shaft section 67 which is pivotally secured to the shaft sections 64 by pins 68. Secured to one of the threaded rods 55 is a sprocket 70 operatively connected by a sprocket chain 71 to a sprocket 72 which is secured to the shaft 73 of a three-phase motor 74, the motor 74 being mounted upon the frame 60. The motor 74 is connected by suitable means hereinafter described to a suitable source (not shown) of electrical energy and may be operated to rotate the threaded rods 55 first in one direction and then in the opposite direction to reciprocate the carriage 46.

Figure 6:
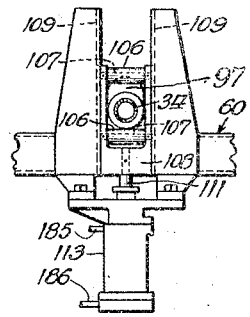
Fig. 6 is a section taken on line 6—6 of Fig. 5.
Figure 5:
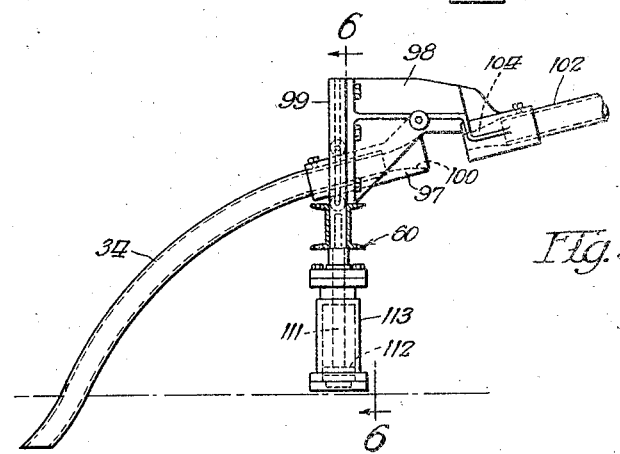
Fig. 5 is a section taken on line 5—5 of Fig. 2.

The tube 34 is secured in a tubular casting 97 pivotally mounted upon a bracket 98 mounted upon vertically disposed brackets 99 which are in turn mounted upon the frame 60. The tubular member 97 is provided with a flaring mouth 100 which opens into the tube 34. Secured in the bracket 98 is one end of a tube 102, the other end of which is conveniently disposed with respect to a rolling mill (not shown). An aperture 104 in the bracket 98 opens into the tube 102 and is aligned with the mouth 100 when the tube 34 is in the position wherein it is shown in full lines in Fig. 6. The mouth 100 is spaced from the aperture 104 so that in the event rod is delivered by the tube 102 into the tube 34 when the coiling machine 20 is in a functionally inoperative condition, the rod may be severed intermediate the tube 102 and the tube 34 and readily withdrawn therefrom. The tubular member 97 passes between rollers 106 journaled upon pins 107 secured in a slide 108 which is mounted in ways 109 formed on the brackets 99. The slide 108 is pinned to a piston rod 111 of a piston 112 disposed in a pneumatic cylinder 113. The cylinder 113 is connected to the supply (not shown) of fluid under pressure by means hereinafter described which controls the admission of the fluid to the cylinder in such manner that the slide 108 may be reciprocated to bring the tube 34 into and out of its functionally operative position with respect to the coiling machine 20, thus permitting the tube 34 to be withdrawn from the path of the carriage 46 when coiled rod is to be transferred to the conveyor 48.

As shown in Fig. 15 the circuit which connects the motor 74 with the source (not shown) of electrical energy comprises mains 115, 116, and 117, electrical switches 120, 140, 150, and 160, and relays 200 and 300.

The switch 140 comprises an insulating panel 141 carrying contacts 142 and 143 which may be bridged by a contact 144 mounted upon and insulated from a rod 145. The rod 145 is slidably journaled in bearings 146 and is normally held by a compression spring 147 in a position wherein the contact 144 engages the contacts 142 and 143. A roller 148 is rotatably mounted in the lower end of the rod 145. The switch 140 is mounted upon the frame 60 in a position wherein a cam plate 162 mounted upon the carriage 46 will engage the roller 148 when the carriage is in its left hand position (Fig. 2) and will hold the roller 148 and the rod 145 in positions wherein the contact 144 will be spaced from the contacts 142 and 143.

The switch 150 is substantially identical with the switch 140, the several parts thereof being indicated by the reference numerals 151 to 158, inclusive. The last digit of each reference character designating a part of the switch 150 is identical with the last digit of a reference character designating a like part of the switch 140. The switch 150 is mounted upon the frame 60 in a position wherein the roller 158 will be engaged by the cam 162 when the carriage 46 is in its right hand position (Fig. 2). The contact 154 will then be spaced from the contacts 152 and 153.

Figure 8:
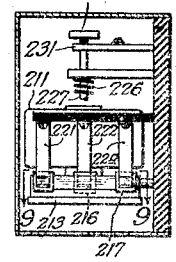
Fig. 8 is a section taken on line 8—8 of Fig. 7.
Figure 9:
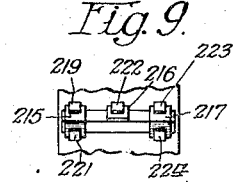
Fig. 9 is a section taken on line 9—9 of Fig. 8.

The switch 120 is mounted upon the base 21 in a position wherein arms 121 and 122 of a bell crank lever 123 forming a part of the switch may be engaged by a metallic roller 124 mounted upon and insulated from a bar 125 fixed to the coupling 39. The arm 122 has a slot 127 in which rides one end of a pin 128 projecting from a slide 130. Mounted in the slide 130 and insulated from each other are contacts 132 and 133 which may be bridged by the roller 124 when the roller is brought into a position wherein it is shown in Fig. 8 during the upward travel of the stripping plate 36. The arrangement is such that when the roller 124 moves upwardly it will engage a latch member 136 pivoted upon the arm 121, will swing the latch member out of its path, and will then momentarily engage the contacts 132 and 133 as it passes them. After passing the contacts 132 and 133 the roller 124 will engage the arm 122 and will rotate the bell crank lever 123 in a counter-clockwise direction (Fig. 8) to move the pin 128, the slide 130, and the contacts 132 and 133 to the left (Fig. 12), a distance which will permit the roller 124 to return to its lowermost position without again engaging the contacts 132 and 133. During its downward stroke the roller 124 engages the latch member 136 and rotates the bell crank lever 123 in a clockwise direction (Fig. 12) to restore the contacts 132 and 133 to the positions wherein they are shown in Fig. 12.

The relay 200 comprises a winding 211, an armature 212 having an extension 213, and contacts 215, 216, and 217 mounted upon and insulated from the extension. When the winding 211 is energized, the contact 215 engages a pair of contacts 219 and 221, the contact 216 engages a contact 222, and the contact 217 engages a pair of contacts 223 and 224. Urged against the extension 213 by a compression spring 226 is a slidably mounted rod 227 carrying a contact 228 adapted to engage a pair of contacts 229 and 231 when the winding 211 is de-energized, the contact 228 being spaced from the contacts 229 and 231 when the winding is energized.

The relay 300 is substantially identical with the relay 200 and its parts are identified by reference numerals ranging from 211 to 231. The last two digits of each reference character designating a part of the relay 300 are identical with the last two digits of each reference character designating a like part of the relay 200.

Referring to Fig. 15, the main 115 is connected to one terminal of the switch 160. The main 116 is connected to the contacts 133, 224, 222, 322, 331, and 321. A second terminal of the motor 74 is connected to the contacts 223 and 323. The third terminal of the motor 74 is connected to the contact 229. The contact 216 is connected to one terminal of the winding 211 and to the contact 329. The contact 316 is connected to one terminal of the winding 311 and to the contact 231. The contact 142 is connected to the other terminal of the winding 211. The contacts 143 and 152 are connected to each other and to the other terminal of the switch 160. The contact 153 is connected to the other terminal of the winding 311. Fig. 15 diagrammatically illustrates the condition which exists in the circuit when the carriage 46 is in its left hand position (Fig. 2) and the apparatus is ready to function.

In Fig. 16 the means for controlling the admission of fluid under pressure to the cylinders 42 and 113 is shown. This means comprises a manually operable four-way valve 170, a four-way valve 171, and a three-way valve 172. The valve 170 and 171 are connected by pipes 174 and 175, respectively, to the source (not shown) of fluid under pressure and are connected to the cylinder 42 by pipes 177 and 178. The valves 170 and 172 are connected to the cylinder 42 by pipes 180 and 181 and the valves 171 and 172 are connected to each other by a pipe 183. The cylinder 113 is connected to the valves 171 and 172 by pipes 185 and 186, respectively. An exhaust pipe 187 is connected to the valve 170. The valves 171 and 172 are provided with a common valve stem 190 to which is rigidly secured a bifurcated lever 191 adapted to be engaged by a pin 193 mounted upon the carriage 46. The construction is such that when the carriage travels to the right (Fig. 1) the pin 193 will engage the bifurcations of the lever 191 and manipulate the valve 171 and 172 so that the pipe 175 will communicate through the valve 171 with the pipe 183, and the pipe 183 will communicate through the valve 172 with the pipe 186. During the return stroke of the carriage 46 the pin 193 will engage the bifurcations of the lever 191 and return the valves to the position wherein they are shown in Fig. 16. Fig. 16 illustrates the condition which exists when rod is being coiled, the stripping plate 36 being in its lowermost position and the tube 34 being in its functionally operative position with respect to the coiling machine 20.

In the operation of the apparatus the motor 22 is connected to any suitable source (not shown) of electrical energy by the operator and the rod is guided to the pins 31 and 32 through the tubes 102 and 34. When the rod has been coiled, the motor 22 is brought to a stop, and the operator manipulates the valve 170 so that fluid under pressure may flow through the pipe 174, the valve 170, the pipes 180 and 181, the valve 172 and the pipe 186 to the cylinders 42 and 113, the fluid being delivered to the cylinder 42 by the pipe 181. The cylinder 113 then communicates with the exhaust pipe 187 through the pipe 185, the valve 171, the pipes 177 and 178, and the valve 170, and the cylinder 42 communicates with the exhaust pipe through the pipes 181 and 180, and the valve 170. The stripping plate 36 is then forced upwardly by the piston 41 to strip the coiled rod from the pins 32 and to raise it to the level of the floor 43. Simultaneously therewith, the piston 112 is moved upwardly to swing the tube 34 out of the path of the carriage 46. During the stripping operation the roller 124 momentarily bridges the contacts 132 and 133, thus closing a circuit which may be traced as follows: From the contact 132 through the contacts 229, 228, 231, the winding 311, contacts 153, 154, and 152, the switch 160, the main 115, the main 117, the contact 133 and the roller 124. The winding 311, then energized, causes the contact 316 to engage the contact 322, causes the contact 315 to engage the contacts 319 and 321, causes the contact 317 to engage the contacts 323 and 324, and causes the contact 328 to be withdrawn from the contacts 329 and 331. The motor 74 will then be connected to the source (not shown) of electrical energy as follows: One phase of the current will flow through the main 115 directly to one terminal of the motor. A second phase of the current will flow through the main 116, the contacts 324, 317, and 323 to a second terminal of the motor. A third phase of the current will flow through the main 117, the contacts 321, 315, and 319 to a third terminal of the motor. The motor 74 when so operated rotates the threaded rods 55 in a proper direction to advance the carriage 46 toward the conveyor 48 so that the posts 45 will engage the coiled rod and push it across the floor 43 into the conveyor. During the forward stroke of the carriage 46, the pin 193 engages the bifurcations of the lever 191 and manipulates the valves 171 and 172 in the manner above described to connect the cylinder 113 directly to the pipe 175 so that the tube 34 will be prevented from returning into the path of the carriage 46 until the carriage has passed it during the return stroke. When the coiled rod has been removed from the stripping plate 36, the operator manipulates the valve 170 in such manner that the pipe 174 is connected to the cylinder 42 through the valve and the pipe 178, the cylinder 42 being simultaneously connected with the exhaust pipe 187 through the pipes 180 and 181 and the valve. Preferably, the valve 170 is so manipulated directly after the posts 45 have removed the coiled rod from the stripping plate 36 that the motor 22 may be brought up to the desired speed, for the following coiling operation, before the carriage 46 has completed its return stroke. When the carriage 46 has been advanced to the position wherein the posts 45 deposit the coiled rod upon the conveyor 48, the cam 162 engages the roller 158 and disengages the contact 154 from the contacts 152 and 153, thus de-energizing the winding 311 and causing the contact 328 to engage the contacts 329 and 331, causing the contact 328 to engage the contacts 329 and 331, causing disengagement of the contact 316 from the contact 322, disengagement of the contact 315 from the contacts 316 and 321, and disengagement of the contact 317 from the contacts 323 and 324. The winding 211 is then energized by current flowing in a circuit which may be traced as follows: From the main 115 through the switch 160 through the contacts 143, 144, and 142, winding 211, the contacts 329, 328, and 331, and the main 117. The motor 74 will then be connected to the mains 115, 116, and 117 in such manner that its direction of rotation will be reversed and the threaded rods 55 will be rotated to retract the carriage 46, the motor being connected to the source of electrical energy as follows: Through the main 115 to one terminal of the motor; through the main 116, the contact 221, the contact 215, and the contact 219 to a second terminal of the motor, and through the main 117, the contact 224, the contact 217, and the contact 223 to a third terminal of the motor. During the return stroke of the carriage 46, the pin 193 again engages the lever 191 and restores the valves 171 and 172 to the condition illustrated in Fig. 16 so that the tube 34 again assumes its operative position with respect to the coiling machine 20. When the carriage 46 enters its left hand position (Fig. 1) the cam 162 will engage the roller 148 to disengage the contact 144 from the contacts 142 and 143. This de-energizes the winding 211, and the contacts of the relay 200 are restored to the positions wherein they are shown in Fig. 15, and the motor 74 is brought to a full stop.

What is claimed is:

1. The combination with means for coiling an element, of means for guiding the element to the coiling means, means controlled by the coiling means and operable upon the completion of the coiling operation for removing the element from the coiling means, common means for controlling the guiding means and the removing means, and means operated by the removing means for rendering the controlling means ineffective with respect to the guiding means.

2. The combination with means for coiling an element, of means for guiding the element to the coiling means, means controlled by the coiling means and operable upon the completion of the coiling operation for removing the element from the coiling means, manually operable common means for controlling the guiding means and the removing means, and means operated by the removing means for rendering the controlling means ineffective with respect to the guiding means.

3. The combination with means for coiling an element, of means for guiding the element to the coiling means, means controlled by the coiling means and operable upon the completion of the coiling operation for removing the element from the coiling means, fluid pressure means for controlling the guiding means and the removing means, and means operated by the removing means for rendering the controlling means ineffective with respect to the guiding means.

4. In combination with material working apparatus, means for guiding the material to the apparatus, means controlled by the coiling means and operable upon the completion of the coiling operation for removing the material from the apparatus, means for causing relative motion between the apparatus and the guiding means to cause the guiding means and the apparatus to assume relatively operative positions, and means controlled by the removing means for operating the last mentioned means.

5. In combination with material working apparatus, means for guiding the material to the apparatus, means controlled by the coiling means and operable upon the completion of the coiling operation for removing the material from the apparatus, fluid pressure means for causing relative motion between the apparatus and the guiding means to cause the guiding means and the apparatus to assume relatively operative positions, and means controlled by the removing means for operating the last mentioned means.

6. The combination with means for coiling an element, of means for guiding the element to the coiling means, means for stripping the element from the coiling means, and common means for co-operatively controlling the stripping means and the guiding means.

7. The combination with means for coiling an element, of a second means for guiding the element to the coiling means, a third means for stripping the element from the coiling means, a fourth means controlled by the coiling means and operable upon the completion of the coiling operation for causing relative motion between the coiling means and the stripping means, a fifth means to remove the coiled element from the coiling means for causing relative motion between the guiding means and the coiling means, and a sixth means common to the fourth and fifth means for co-operatively controlling them.

8. The combination with means for coiling an element, of a second means for guiding the element to the coiling means, a third means for stripping the element from the coiling means, a fourth means controlled by the coiling means and operable upon the completion of the coiling operation for causing relative motion between the coiling means and the stripping means to remove the coiled element from the coiling means, a fifth means for causing relative motion between the guiding means and the coiling means, a sixth means common to the fourth and fifth means for co-operatively controlling them, and a seventh means controlled by the stripping means for rendering the sixth means ineffective with respect to the fifth means.

9. The combination with means for coiling an element, of means for guiding the element to the coiling means, means for stripping the element from the coiling means, fluid pressure means for causing relative motion between the stripping means and the coiling means to remove the coiled element, and a second fluid pressure means for causing relative motion between the guiding means and the coiling means.

10. The combination with means for coiling an element, of means for guiding the element to the coiling means, means for stripping the element from the coiling means, fluid pressure means for causing relative motion between the stripping means and the coiling means to remove the coiled element, a second fluid pressure means for causing relative motion between the guiding means and the coiling means, and common means for co-operatively and selectively controlling the first fluid pressure means and the second fluid pressure means.

11. The combination with means for coiling an element, of means for guiding the element to the coiling means, means for stripping the element from the coiling means, fluid pressure means for causing relative motion between the stripping means and the coiling means to remove the coiled element, a second fluid pressure means for causing relative motion between the guiding means and the coiling means, common means for co-operatively and selectively controlling the first fluid pressure means and the second fluid pressure means, and means for rendering the controlling means ineffective with respect to the second fluid pressure means.

12. The combination with means for coiling an element, of means for guiding the element to the coiling means, means for stripping the element from the coiling means, fluid pressure means for causing relative motion between the stripping means and the coiling means to remove the coiled element, a second fluid pressure means for causing relative motion between the guiding means and the coiling means, common means for co-operatively and selectively controlling the first fluid pressure means and the second fluid pressure means, and means controlled by the stripping means for rendering the controlling means ineffective with respect to the second fluid pressure means.

13. The combination with means for coiling an element, of means for guiding the element to the coiling means, means for stripping the element from the coiling means, fluid pressure means for causing relative motion between the stripping means and the coiling means to remove the coiled element, a second fluid pressure means for causing relative motion between the guiding means and the coiling means, and manually operable means for co-operatively and selectively controlling the first fluid pressure means and the second fluid pressure means.

14. The combination with means for coiling an element, of means for guiding the element to the coiling means, means for stripping the element from the coiling means, fluid pressure means for causing relative motion between the stripping means and the coiling means to remove the coiled element, a second fluid pressure means for causing relative motion between the guiding means and the coiling means, manually operable means for co-operatively and selectively controlling the first fluid pressure means and the second fluid pressure means, and means for rendering the manually operable means ineffective with respect to the second fluid pressure means.

15. The combination with means for coiling an element, of means for guiding the element to the coiling means, means for stripping the element from the coiling means, fluid pressure means for causing relative motion between the stripping means and the coiling means to remove the coiled element, a second fluid pressure means for causing relative motion between the guiding means and the coiling means, manually operable means for co-operatively and selectively controlling the first fluid pressure means and the second fluid pressure means, and means controlled by the stripping means for rendering the manually operable means ineffective with respect to the second fluid pressure means.

16. The combination with means for coiling an element, means for guiding the element to the coiling means, means for stripping the coiled element from the coiling means, common means for co-operatively controlling the stripping means and the guiding means, means for removing the coiled element from the stripping means, and means operating upon the completion of the stripping operation for transferring the control of the guiding means to the last-mentioned means to maintain the guiding means in an inoperative position during the removal of the coiled element from the stripping means.

17. The combination with means for coiling an element, means for guiding the element to the coiling means, means for stripping the coiled element from the coiling means, common means for co-operatively controlling the stripping means and the guiding means, means for removing the coiled element from the stripping means, and means operating upon the completion of the stripping operation for transferring the control of the guiding means to the last-mentioned means and for returning it to the common means after the removal of the coiled element from the stripping means.

18. The combination with means for coiling an element, means for guiding the element to the coiling means, means for stripping the coiled element from the coiling means, manually operable means for co-operatively controlling the stripping means and the guiding means, means for removing the coiled element from the stipping means, and means operating upon the completion of the stripping operation for transferring the control of the guiding means to the last-mentioned means after the removal of the coiled element from the stripping means.

19. The combination with means for coiling an element, means for guiding the element to the coiling means, means for stripping the coiled element from the coiling means, manually operable means for co-operatively controlling the stripping means and the guiding means, means for removing the coiled element from the stripping means operating upon the completion of the stripping operation, and means for transferring the control of the guiding means to the last-mentioned means and for returning it to the manually operable means after the removal of the coiled element from the stripping means.

20. The combination with means for coiling an element, of means for guiding the element to the coiling means, means for stripping the coiled element from the coiling means, common means for controlling the stripping means and for causing the guiding means and the coiling means to assume relatively inoperative positions, means for removing the coiled element from the stripping means, and means controlled by the last-mentioned means for preventing the coiling means and guiding means from assuming relatively operative positions during the operation of the removing means.

21. The combination with means for coiling an element, of means for guiding the element to the coiling means, means for stripping the element from the coiling means, fluid pressure means for causing relative motion between the guiding means and the coiling means to cause them to assume relatively inoperative positions to permit the removal of the coiled element from the stripping means, means for removing the element from the stripping means, and means for placing the last-mentioned means in control of the fluid pressure means to prevent the guiding and coiling means to reassume operative positions during the removal of the element.

22. The combination with means for coiling an element, of means for guiding the element to the coiling means, means for removing the element from the coiling means, means operating contemporaneously with the last mentioned means for causing relative motion between the guiding means and the coiling means to cause them to assume relatively inoperative positions, and means for preventing the guiding means and the coiling means from assuming relatively operative positions during the operation of the removing means.

23. The combination with means for coiling an element, of means for guiding the element to the coiling means, means for removing the element from the coiling means, means operating contemporaneously with the last-mentioned means for causing relative motion between the guiding means and the coiling means to cause them to assume relatively inoperative positions, and means controlled by the removing means for preventing the guiding means and the coiling means from assuming relatively operative positions during the operating of the removing means.

24. The combination with means for coiling an element, of means for guiding the element to the coiling means, means for stripping the element from the coiling means, traveling means for removing the element from the stripping means, and means operating contemporaneously with the stripping means for bringing the guiding means out of the path of the traveling means.

25. The combination with means for coiling an element, of means for guiding the element to the coiling means, means for stripping the element from the coiling means, traveling means for removing the element from the stripping means, means operating contemporaneously with the stripping means for bringing the guiding means out of the path of the traveling means, and means for preventing the guiding means from returning into the path of the traveling means during the removal of the element thereby.

26. The combination with means for coiling an element, of means for guiding the element to the coiling means, means for stripping the element from the coiling means, traveling means for removing the element from the stripping means, means operating contemporaneously with the stripping means for bringing the guiding means out of the path of the traveling means, and means controlled by the traveling means for preventing the guiding means from returning into the path of the traveling means.

27. The combination with means for coiling an element, of means for guiding the element to the coiling means, means for stripping the element from the coiling means, reciprocating means for removing the element from the stripping means, and means operating contemporaneously with the stripping means for bringing the guiding means out of the path of the reciprocatory means.

28. The combination with means for coiling an element, of means for guiding the element to the coiling means, means for stripping the element from the coiling means, reciprocating means for removing the element from the stripping means operating contemporaneously with the stripping means, means for bringing the guiding means out of the path of the reciprocatory means, and means controlled by the reciprocatory means for preventing return of the guiding means into the path of the reciprocatory means during the excursion thereof.

29. The combination with means for coiling an element, of means for guiding the element to the coiling means, means for stripping the element from the coiling means, and means for causing the stripping means to move from one position to a second position with respect to the coiling means and for causing the guiding means to move from one position to another with respect to the coiling means, the last-mentioned means being adapted to permit return of the stripping means to its first position before the guiding means is returned to its first position thereby preventing the guidance of the element to the coiling means while the stripping means is in an abnormal position.

30. The combination with means for coiling an element, of means for guiding the element to the coiling means, means for stripping the element from the coiling means, means operated contemporaneously therewith for raising the guiding means into an inoperative position with respect to the coiling means to permit the removal of the coiled element from the stripping means, reciprocating means for removing the element from the stripping means, and means controlled thereby for maintaining the guiding means in its inoperative position during the reciprocation of the reciprocating means and thereafter returning the guiding means to its operative position with respect to the coiling means.

In witness whereof, I hereunto subscribe my name this 30th day of October A. D., 1924.

RALPH COLLINS WALTER.